H. S. BANKS.
HORIZONTAL WIND MOTOR.
APPLICATION FILED OCT. 10, 1911.
1,035,844.
Patented Aug. 20, 1912.
4 SHEETS—SHEET 3.
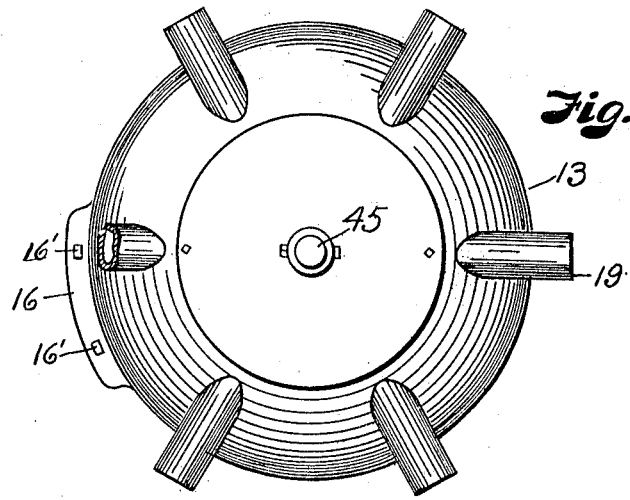
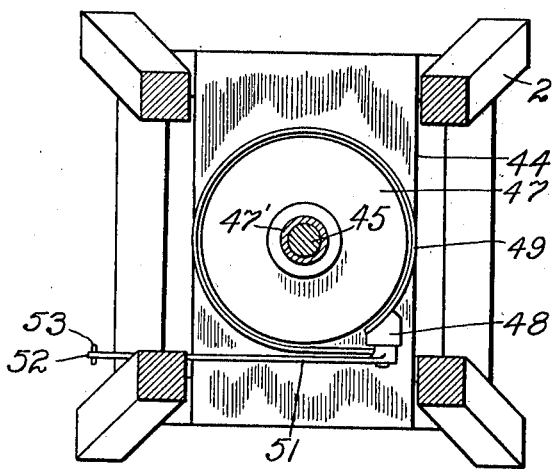
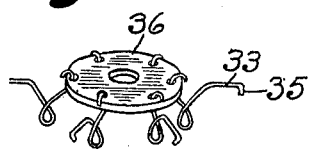
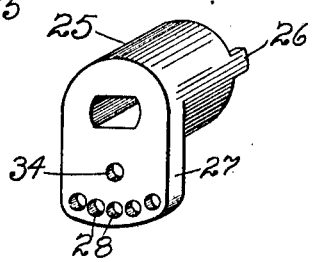
WITNESSES:
Arthur W. Caps.
Myrtle M. Jackson.
INVENTOR.
H. S. Banks.
BY Arthur C. Brown
ATTORNEY.

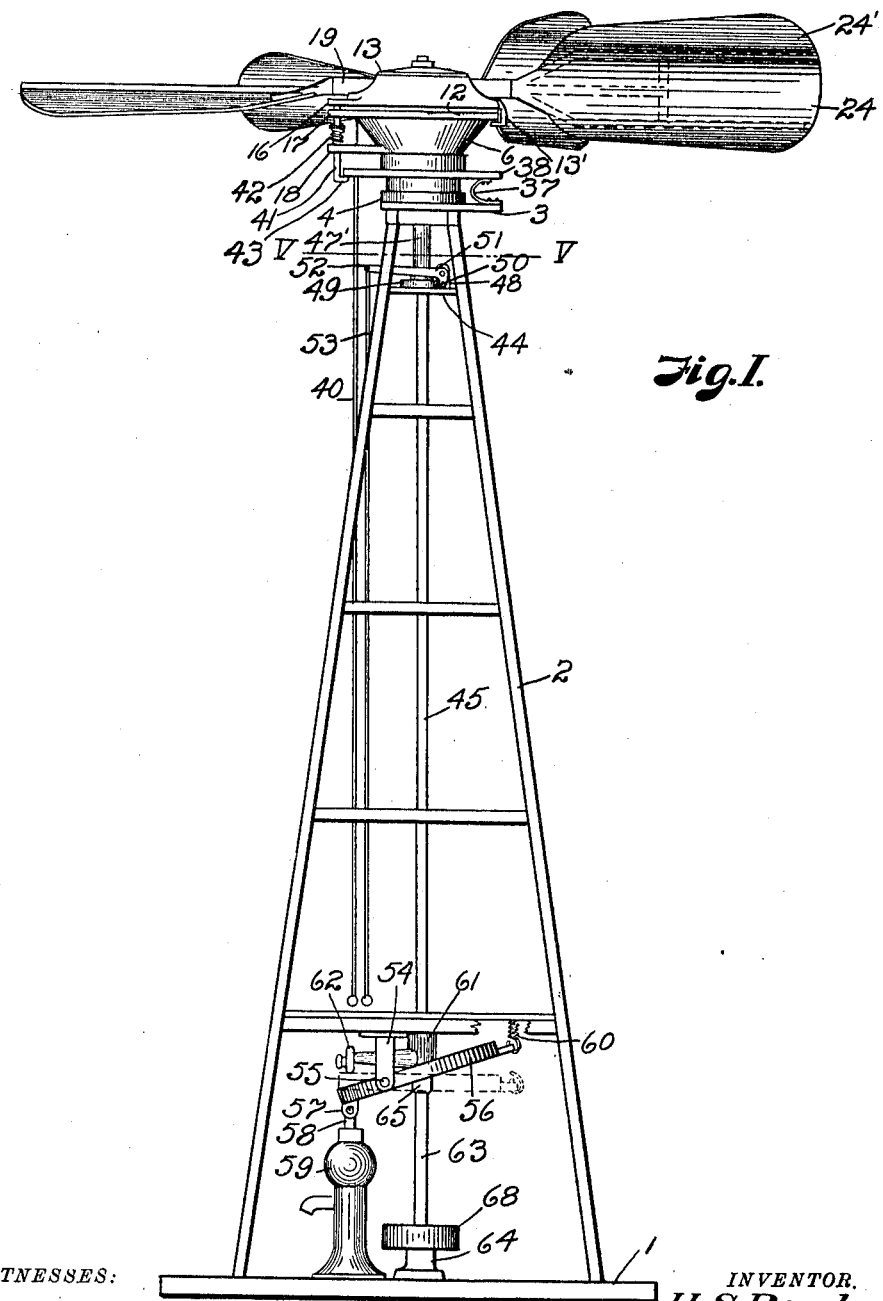

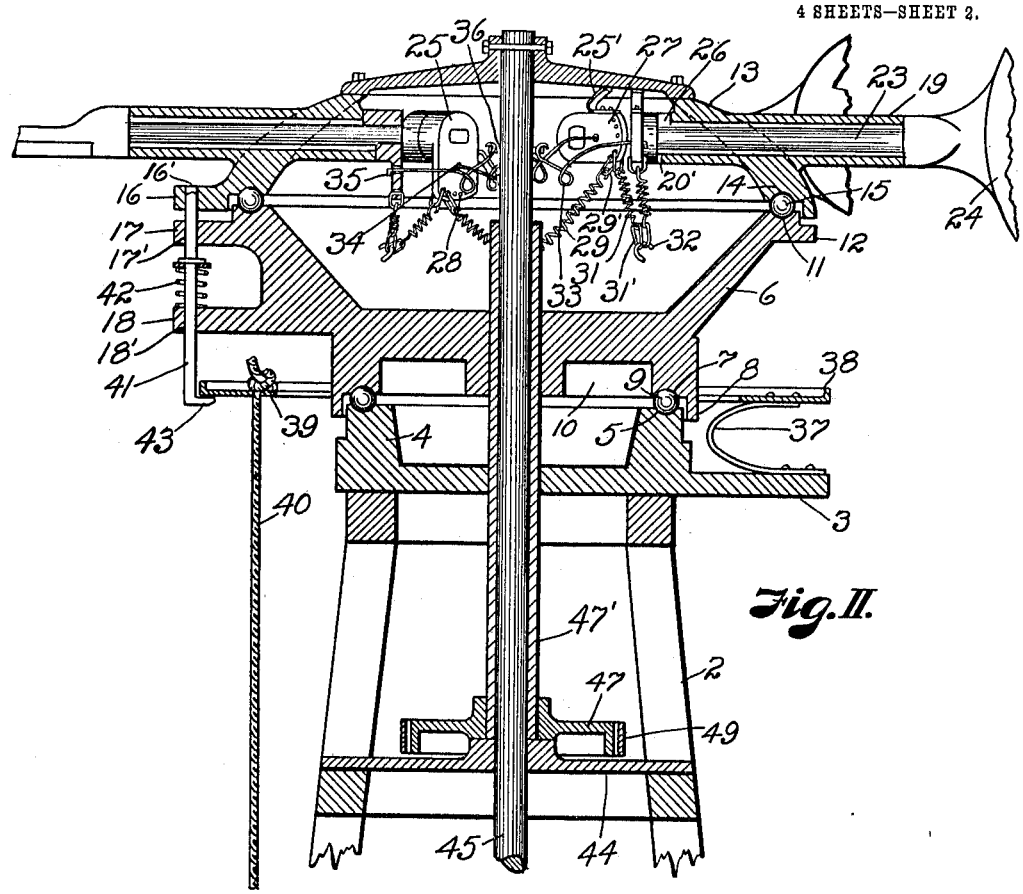

H. S. BANKS.
HORIZONTAL WIND MOTOR.
APPLICATION FILED OCT. 10, 1911.
1,035,844.
Patented Aug. 20, 1912.
4 SHEETS—SHEET 4.
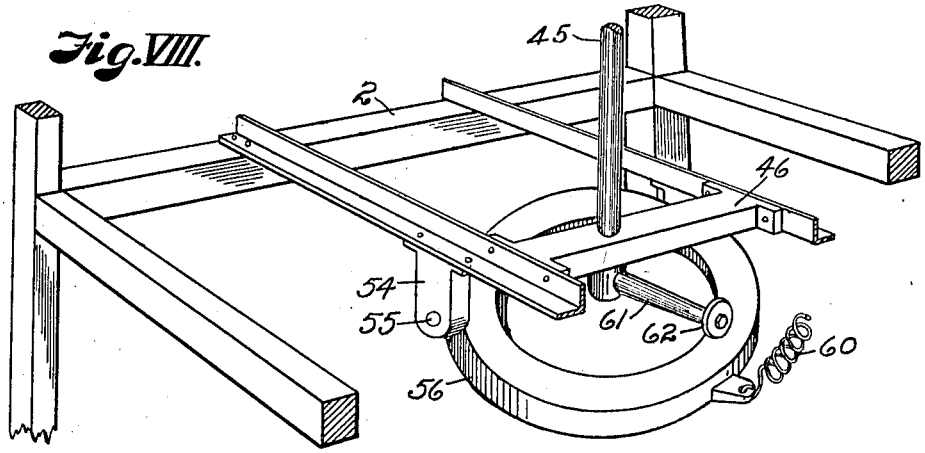
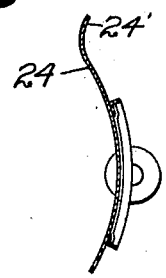
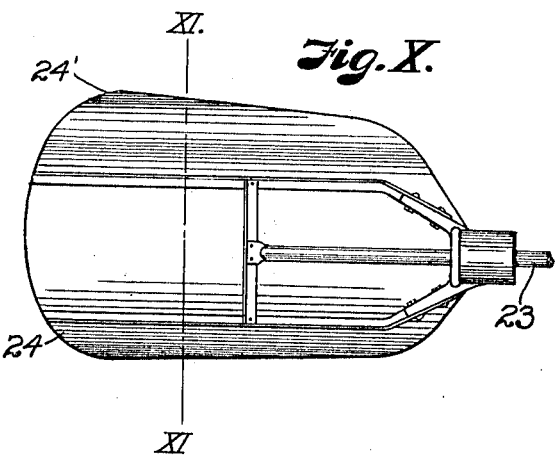
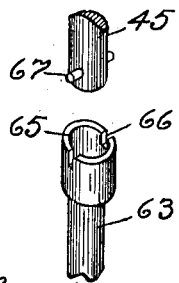
WITNESSES:
Arthur W. Caps.
Myrtle M. Jackson
INVENTOR.
H. S. Banks.
BY Arthur C. Brown
ATTORNEY.
COLUMBIA PLANOGRAPH CO., WASHINGTON, D. C.

UNITED STATES PATENT OFFICE.

HOMER S. BANKS, OF SALINA, KANSAS.

HORIZONTAL WIND-MOTOR.

1,035,844.  Specification of Letters Patent.  Patented Aug. 20, 1912.

Application filed October 10, 1911. Serial No. 653,867.

*To all whom it may concern:*

Be it known that I, HOMER S. BANKS, a citizen of the United States, residing at Salina, in the county of Saline and State of Kansas, have invented certain new and useful Improvements in Horizontal Wind-Motors; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to horizontal wind motors and more particularly to a motor wherein the vanes are arranged horizontally, and adapted for feathering to lessen their resistance when moving against the wind; the present invention being an improvement on the motor shown in my prior Patent, No. 945,210, of Jan. 4, 1910.

The principal objects of my present invention are; to provide improved means for feathering the vanes, together with means for automatically locking all of the vanes in horizontal position when the motor exceeds a predetermined speed; to provide an improved mechanism for locking the motor to the drive shaft; to provide an improved brake, and to provide an improved transmission between the motor drive shaft and the driven member, such as a pump shaft.

In accomplishing these objects, I have provided the improved details of structure, hereinafter described and illustrated in the accompanying drawings, wherein:—

Figure I is a side elevation of a wind motor constructed according to my invention. Fig. II is a central vertical section of the power head and locking and brake parts. Fig. III is a vertical section of the power head, showing the parts in a different position. Fig. IV is a plan view of the power head. Fig. V is a sectional view on the line V—V, Fig. I. Fig. VI is a detail view of the shaft collar and springs for holding the vane shafts. Fig. VII is a detail view of one of the vane shaft cranks. Fig. VIII is a detail perspective of the transmission between the drive shafts and pump rod. Fig. IX is a sectional detail of the pulley shaft mounting. Fig. X is a face view of one of the vanes. Fig. XI is a cross section of same on the line XI—XI, Fig. X.

Referring more in detail to the parts:—

1 designates a platform and 2 a tower, such as are used with ordinary wind-mills. On the top of the tower 2 is a power head base 3, having raised supporting rings 4, provided with a ball race 5 at its upper, outer edge.

6 designates the lower member of the power head, which is provided with a ball race 7 adapted for coöperation with the base race 5, and with a depending peripheral flange 8 surrounding the top of the base.

9 designates bearing balls which are seated in the race 5—7 and provide an anti-friction mounting for the power head.

The lower member 6 is cup shaped and has a circular channel 10 on its under side. In the upper edge of said lower member is a ball race 11 which is formed on the top of the body and above a peripheral flange 12. Supported on the lower member 6 is an upper member 13, having a ball race 14 overlying the lower race 11, so that the upper member is supported on the balls 15 to provide an anti-friction mounting, and having a guide member 13' thereon, the lower end of which is turned beneath the flange 12 of the lower member 6 to keep the parts together. The upper member is provided with a laterally directed flange 16, which is adapted to overlie the vertically spaced ears 17 and 18 of the lower member 6, the flange 16 having a plurality of apertures 16' therein, see Fig. IV and the lower ears 17—18 having each an aperture 17'—18' therein, for a purpose presently set forth.

On the upper member 13 are a number (preferably six) of shaft bearings 19, which extend inwardly and outwardly from said upper member, each of said bearings having a groove 20—20' and socket 21 at its inner end, (Fig. III) the part 20 being deeper than the part 20' to provide the shoulder 22, which is coextensive with the outer edge of the socket 21. Extending through each of said bearings is a shaft 23, the outer end of which carries a vane 24 which is preferably eccentric on the shaft, that is the area of the vane is greater at one side of the extended line of the shaft than it is at the other, so that wind pressure will tend to rock the vane and its shaft. Each of vanes 24 has a laterally curved lip 24' on the edge of its wider section against which the air impinges, when the vane starts to turn with the wind to lift the wider portion of the vane to turn the latter to active position.

Fixed to the inner end of each of the vane shafts is a crank member 25 having a lug 26 projected into the bearing groove 20 and adapted for projection into the socket 22, and having a cranked part 27 at its inner end. The part 22 is fixed on the shaft so as to provide limited longitudinal movement of the latter, in order that the lug may ride in the groove 20 or project into the socket 22. The cranked part 27, of each of the members 25, is preferably fan shaped and provided with apertures 28.

29 designates springs having end links 29' connected with the hook bolts 30 on the lower member 6 of the power head and projected into apertures 28, in the part 27, so that the tension of said springs may be regulated to govern the turning of the vanes, the purpose of said springs being to tension the vanes backwardly against the wind and start same toward the flat position when they turn against the wind. The springs 29 also tend to hold the vanes flat when that position is attained.

31 designates springs having links 31' projected into apertures 28 of the crank members and connected with hook bolts 32 on the member 6. The springs 31 are opposed to the springs 29 and are untensioned when the vanes are flat, their function being to cushion the travel of the vanes when the latter move to their vertical position. The crank members 25 are also provided with flat springs 25' which are adapted to bear against the top of the head when the vanes turn to operative position to further cushion the parts.

In order to hold the vane shafts inwardly and keep the lugs 26 out of the sockets 22, I provide the springs 33, the outer ends of which project through apertures 34 in the fan shaped parts 27 and have downturned ends 35 for holding against said parts, the inner ends of the springs being secured to a collar 36 which is revolubly mounted on the main shaft.

Fixed on the power head base 3 is a U-shaped leaf spring 37, the upper end of which carries a circular body 38 that surrounds the base and has a handle bar 39, to which an operating rope 40 is attached. Extending through apertures 17'—18' in the ears 17—18 of the lower power head member is a latch pin 41, the upper end of which is adapted for projection into an aperture 16' in the upper power head member, and is yieldingly tensioned upwardly by a spring 42 which is attached to the pin and seats on the ear 18. The lower end of pin 41 is turned laterally at 43 and projected beneath the handle 39 of the circular body 38, so that when the body and handle are lowered by pulling on the rope 40, the pin will be lowered against the tension of spring 42 and break the connection between the head members. It is apparent that when the rope is released the springs 37 and 42 will raise the body 38 and latch pin 41 respectively. Fixed to the upper end of the power head and extending downwardly through the lower member, through the base 3 and through a platform 44 near the top of the tower, is a power shaft 45, the lower end of which is journaled in a bearing 46 a short distance above the bottom of the tower see Fig. VIII. Revolubly mounted on the shaft 45 and fixed to the lower head member 6 is a sleeve 47'. Fixed to sleeve 47', immediately above the platform 44 is a circular block 47. Fixed at one end to a post 48 on said platform is a band 49 which encircles the block 47 and has its other end secured to the short arm 50 of a bell crank lever 51 that is pivoted on said post and has a long arm 52 provided with a rope 53 that depends to within reach of the ground. The band 49 is preferably of spring metal, so that it will automatically free itself from the block 47 but can be tightened thereagainst to act as a brake for the motor shaft. Depending from the frame 54 that carries the lower shaft bearing 46 are ears carrying facing gudgeons 55; upon which a ring 56 is pivotally mounted, the ring being concentric with the motor shaft but connected with the gudgeons 55 considerably at one side of its center. Depending from the ring 56 are ears 57 which are pivotally connected with the rod 58 of a pump 59, and connecting the greater section of the ring with the tower frame 54 is a spring 60 that yieldingly retains the ring tilted as shown in Fig. I, and the pump rod in lowered position. Fixed to the motor shaft is an arm 61, having a roller 62 on its outer end adapted to bear against the ring 56 when the shaft is revolved to lower the wider portion of the ring to horizontal position against the tension of the spring 60 and coöperate with said spring to reciprocate the pump rod.

63 designates a pulley shaft which is adapted to revolve in a bearing 64 on the platform 1 and has a socket 65 in its upper end adapted to receive the lower end of the motor shaft, the socket being provided with side slots 66 for receiving the lateral pins 67 on said shaft so that when the pulley shaft is in place it will be revolved by the motor shaft. The pulley shaft is provided with an ordinary pulley 68 over which a belt may be run to drive other machinery.

Presuming the parts to be assembled and constructed as described, the operation of the wind motor is as follows:—With the latch pin 41 projected into the forward aperture 16' in the ear 16 of the upper power head member, and with the brake released, the two power head members will be locked together and the vanes free to turn to their operative position. When the vanes are traveling with the wind, the pressure of the wind will hold the vanes in upright position. As the vanes are brought around so that they travel against the wind, they are turned back in their bearings, first by the action of the springs 29 and later by the pressure of the wind, until the lug 26 engages the opposite edge of the groove 20, when the edges of the vanes will be presented to the wind, and will offer little resistance thereto.

During the operation of the motor under normal wind pressure, the springs 33 will hold the vane shafts inwardly so that when the shafts "feather," the lugs 26 will be held out of the sockets 22. Should the wind blow at greater than normal speed, the speed of the motor will increase until sufficient centrifugal force is generated to move the vane shafts outwardly against the tension of the springs 33, when the lugs 26 will be projected into the sockets 22. As the sockets 22 are so placed that the lugs can enter only when the vanes are horizontal, it is apparent that the motor will remain substantially inoperative until the speed of revolution has been decreased and the centrifugal force is lessened sufficiently to permit the springs to return the vane shafts to position for again turning in the grooves.

When it is desired to stop the motor, the circular body 38 is depressed by pulling rope 40, at which the circular body takes against the laterally turned portion 43 of the pin 41, and in turn withdraws the same from the aperture 16' of the flange 16 of the upper member 13 and the power head revolves until the other aperture 16' registers with the pin 41 which projects therein. The motor is then locked by tightening the brake band 49 against the block 47 on the motor shaft.

It is apparent that when the motor shaft is in revolution the large section of the ring 56 will be rocked downwardly when engaged by roller 62, and lifted by the spring 61 to reciprocate the pump rod; and also that the pulley shaft may be attached and detached at pleasure.

Having thus described my invention, what I claim as new therein and desire to secure by Letters-Patent is:—

1. A wind motor comprising a revoluble power head having horizontal bearings, each provided with a groove in its inner end, vanes having shafts journaled in said bearings, a crank member fixed to the inner end of each of said shafts and having a lug projected into the groove in its bearing, and means connected with said crank member for yieldingly tensioning said vanes toward inoperative position.

2. A wind motor comprising a revoluble power head having horizontal bearings, each provided with a groove in its inner end, vanes having shafts journaled in said bearings, a crank member fixed to the inner end of each of said shafts and having a lug projected into the groove in its bearing, and means adjustably connected with said crank member for yieldingly tensioning said vanes toward inoperative position.

3. A wind motor comprising a power head having bearings therein, each provided with a groove at its inner end, vanes having shafts journaled in said bearings, crank members fixed to the inner ends of said shafts, each of said members having a lug projected into the groove in its bearing and having a fan shaped portion provided with a plurality of apertures, and springs anchored to a part of said head and connected with said crank members through one of the apertures therein.

4. A wind motor comprising a power head having bearings, each of said bearings having a groove at its inner end provided with an outset socket, vanes having shafts journaled in said bearings, a crank member on each of said shafts provided with a lug adapted to travel in the groove in its bearing and for projection into said socket, and means for yieldingly tensioning said crank away from the bearing, for the purpose set forth.

5. A wind motor comprising a power head having bearings, each provided with an end groove and a socket outset from said groove, vanes having shafts journaled in said bearings and adapted for limited longitudinal movement therein, a crank member fixed to each of said shafts and having a lug projected into its bearing groove and adapted for projection into said socket, a shaft fixed to said head, a sleeve loosely mounted on said shaft, and springs carried by said sleeve and connected with said crank members, substantially as and for the purpose set forth.

In testimony whereof I affix my signature in presence of two witnesses.

HOMER S. BANKS.

Witnesses:
  W. L. DRAKE,
  FRANK G. HOUGHTON.